United States Patent [19]

Nakajima

[11] 4,065,984
[45] Jan. 3, 1978

[54] INTERNALLY ACCOMMODATED SPEED CHANGE MECHANISM APPLICABLE TO A BICYCLE

[75] Inventor: Kazuo Nakajima, Kodaira, Japan

[73] Assignee: Xenoah, Co., Yamato, Japan

[21] Appl. No.: 569,015

[22] Filed: Apr. 17, 1975

[30] Foreign Application Priority Data
Jan. 25, 1975 Japan .................................. 50-10725

[51] Int. Cl.² ........................... F16H 3/44; F16H 5/12
[52] U.S. Cl. ................................ 74/750 B; 74/781 B; 74/812
[58] Field of Search ................... 74/750 B, 781 B, 812

[56] References Cited
U.S. PATENT DOCUMENTS
3,438,283  4/1969  Schwerdhöfer .................. 74/750 B Primary Examiner—Samuel Scott
Assistant Examiner—Wesley S. Ratliff, Jr.
Attorney, Agent, or Firm—Jones, Thomas & Askew

[57] ABSTRACT

A bicycle speed change mechanism in which five speeds are obtained with mechanism contained internally within the hub of a bicycle wheel. A pair of planetary gear mechanisms are mounted on a hub axle within a hub body, and two separate speed change rods are provided to selectively and separately control operation of the planetary gear mechanisms to obtain five numerically-different drive ratios. The separate speed change rods are manipulated at the control of the bicycle rider to select gear ratios ranging from the lowest to the highest available gear.

9 Claims, 88 Drawing Figures

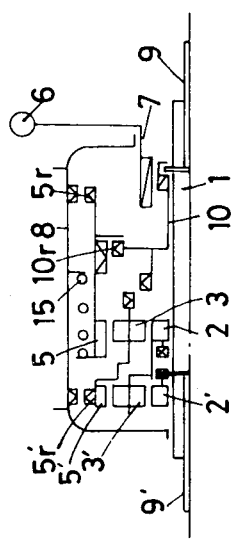
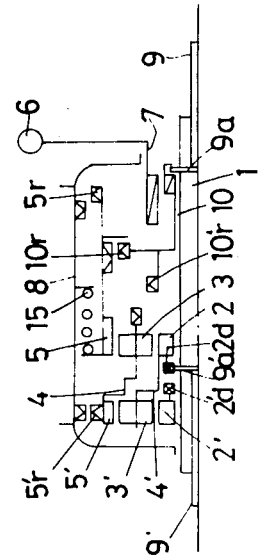
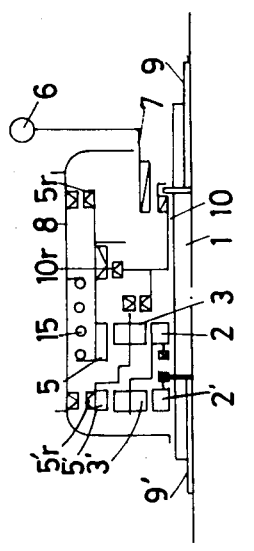
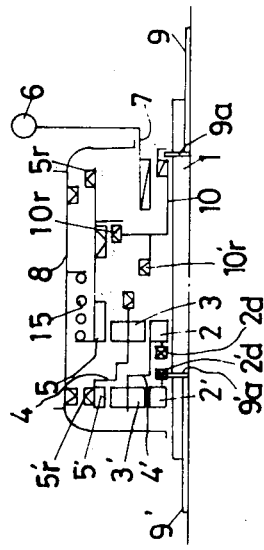
FIG. 3A  FIG. 3B  FIG. 3C  FIG. 3D  FIG. 3E

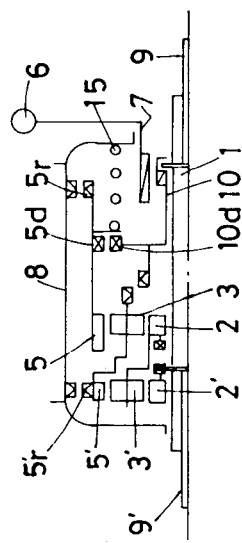
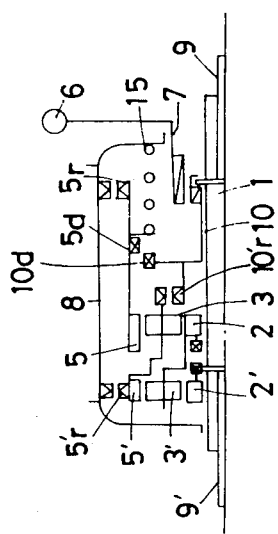
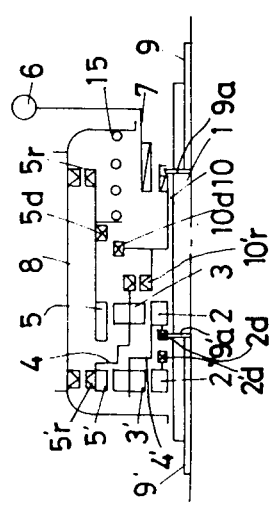
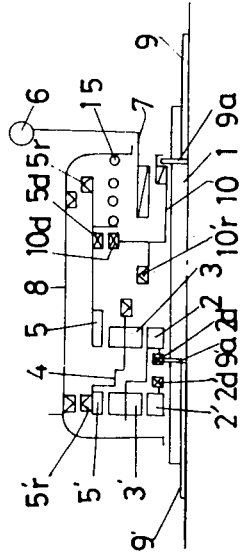
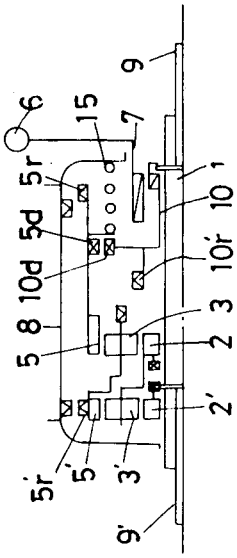

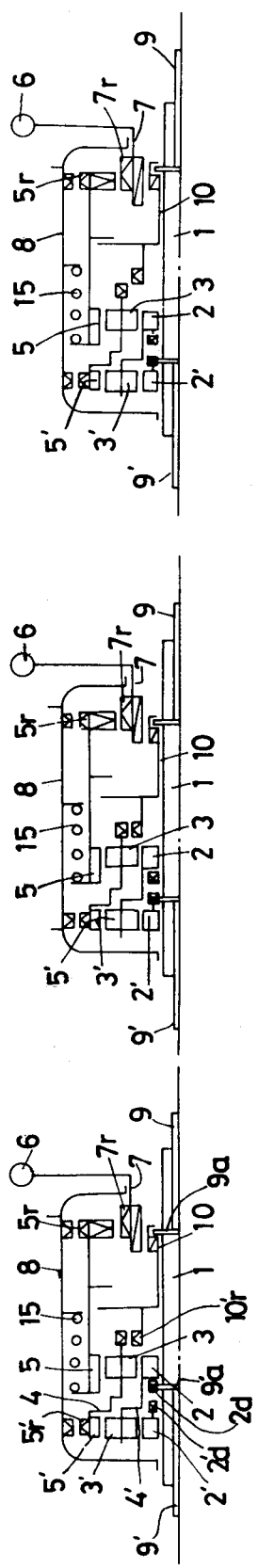

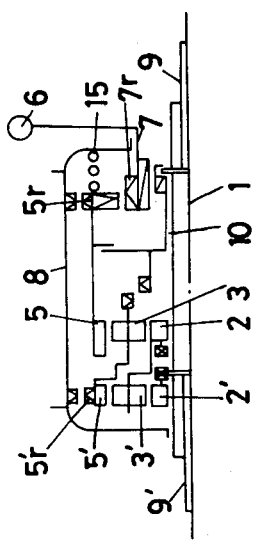
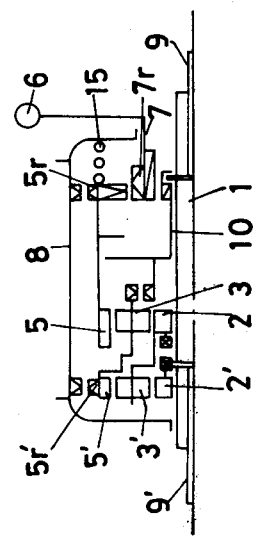
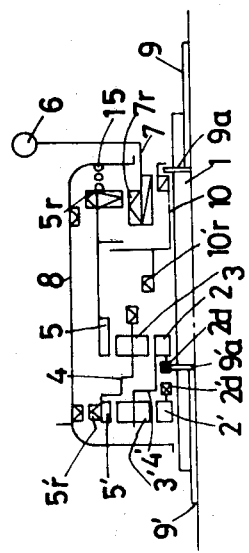
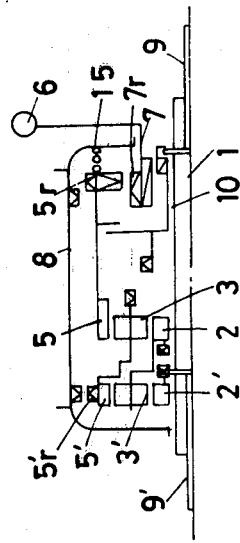

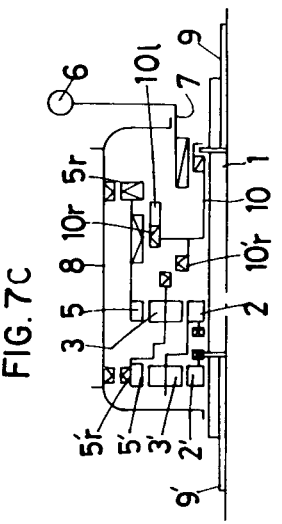
FIG. 7A
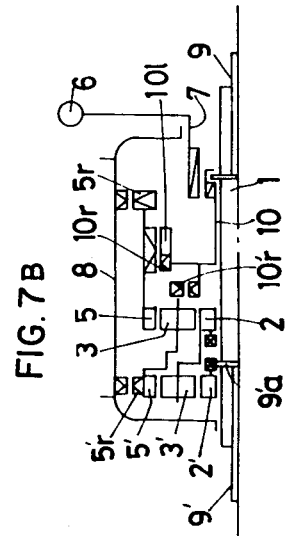
FIG. 7B
FIG. 7C
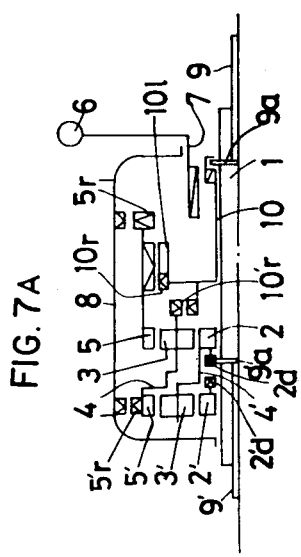
FIG. 7D
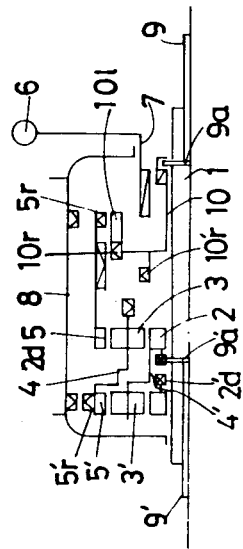
FIG. 7E
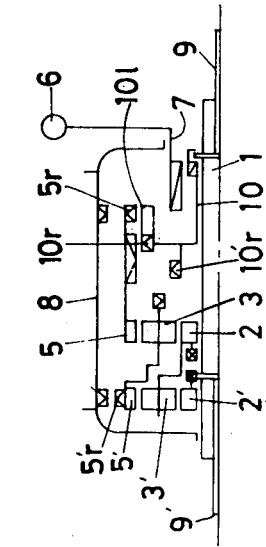

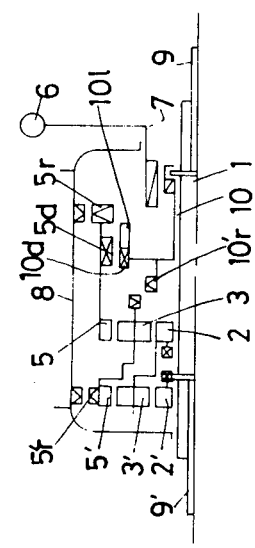
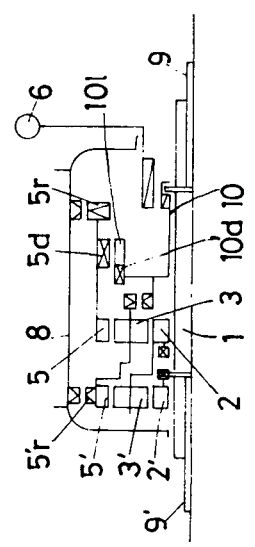
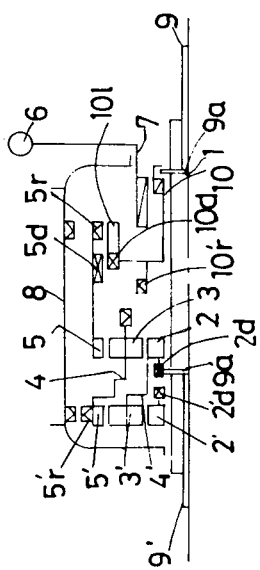
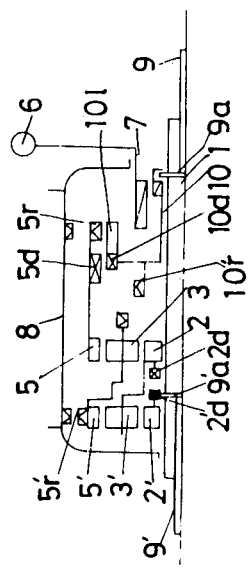

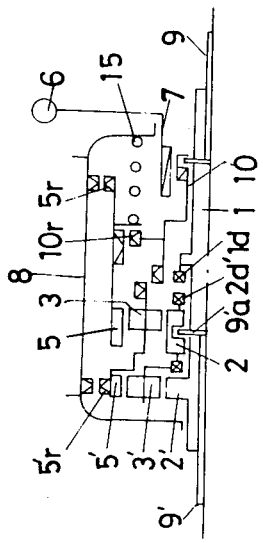
FIG. 10A
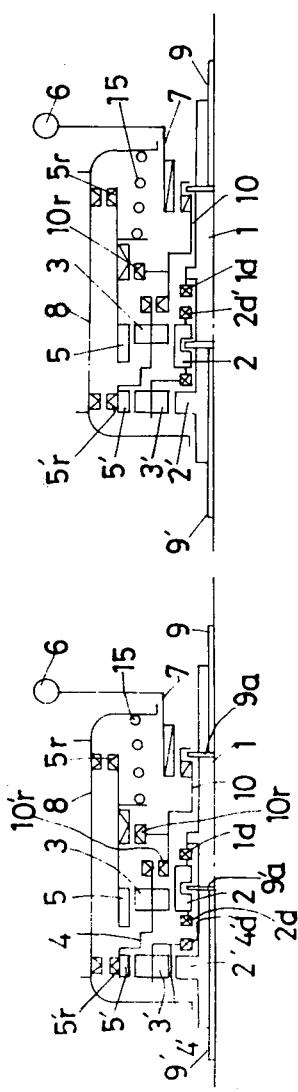
FIG. 10B
FIG. 10C
FIG. 10D
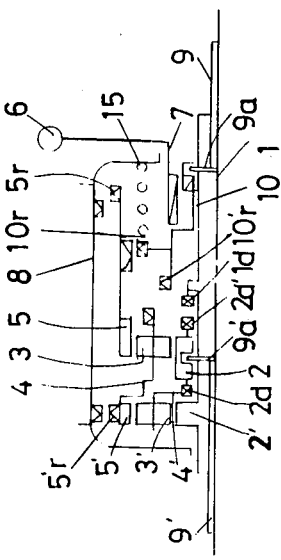
FIG. 10E

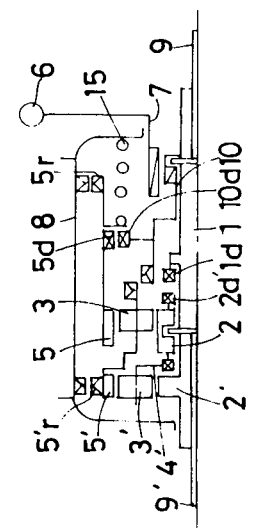
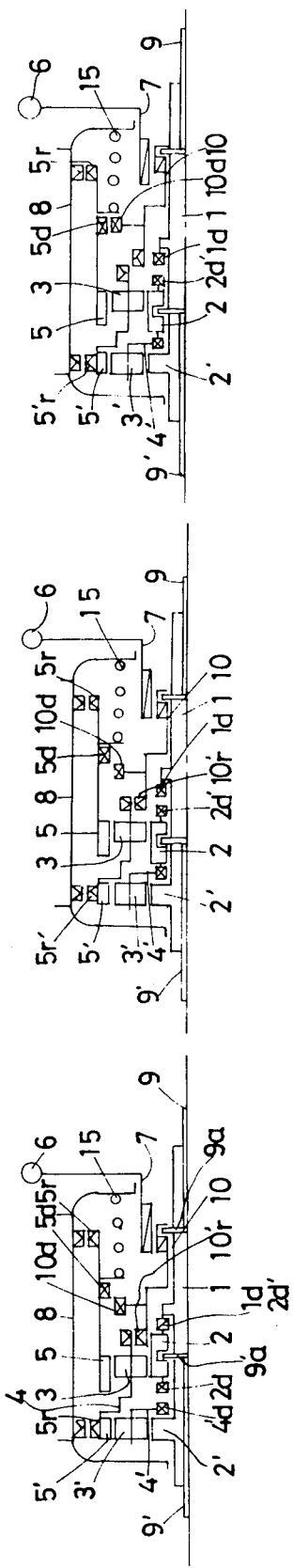
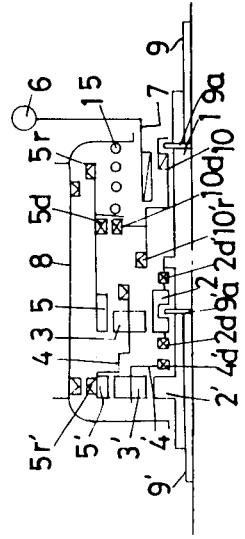
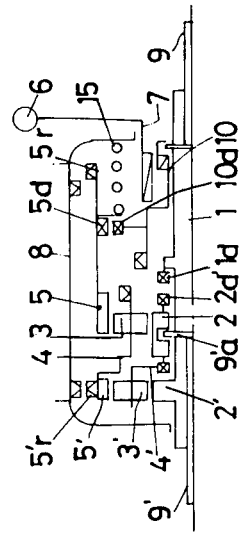
FIG. 12A  FIG. 12B  FIG. 12C  FIG. 12D  FIG. 12E

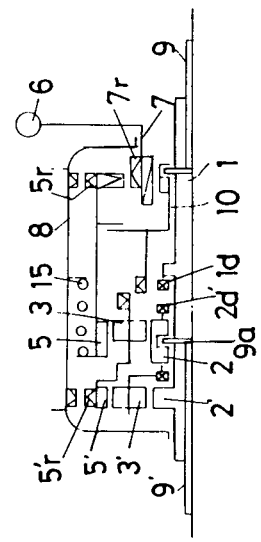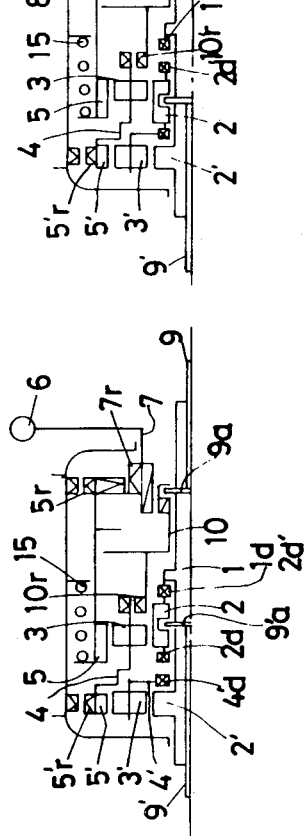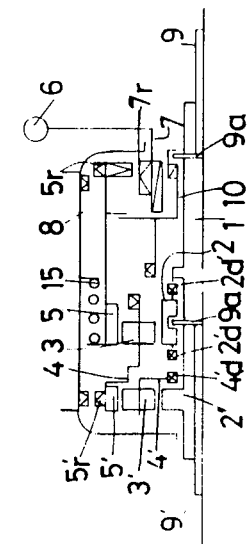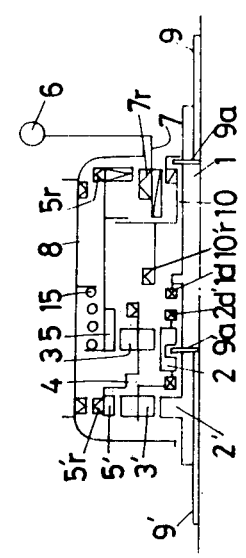

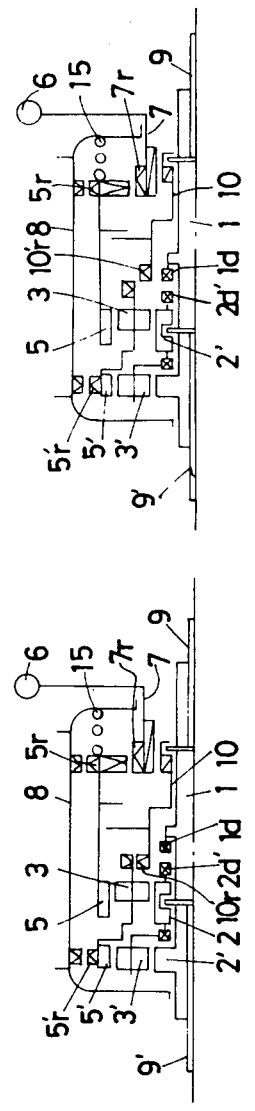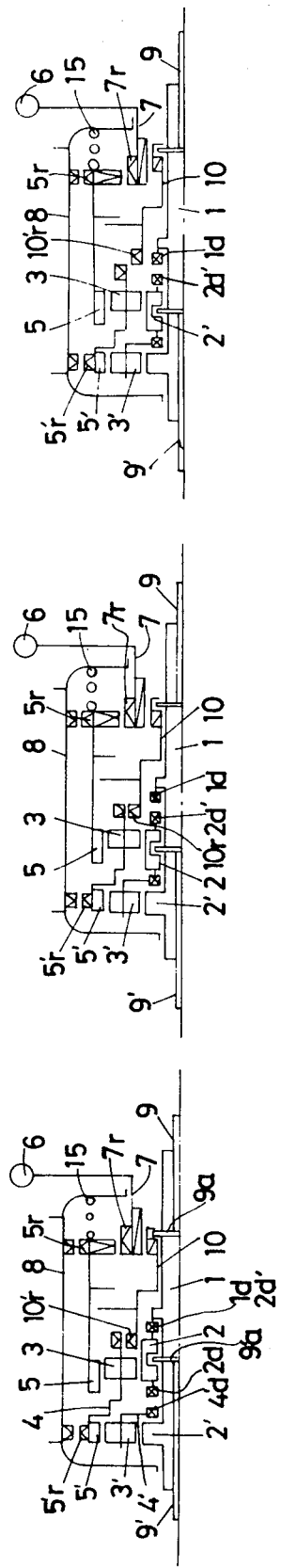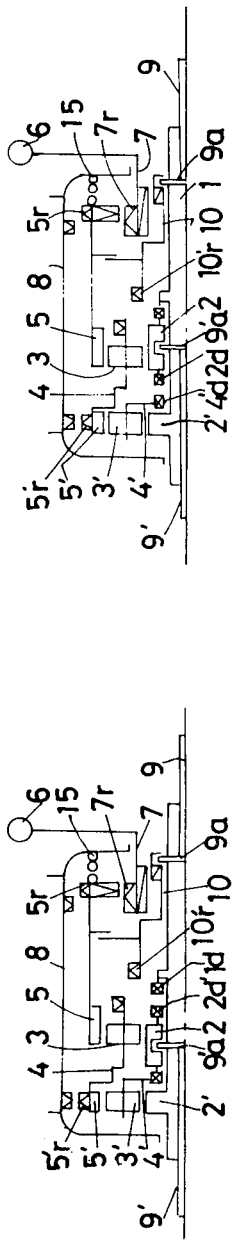

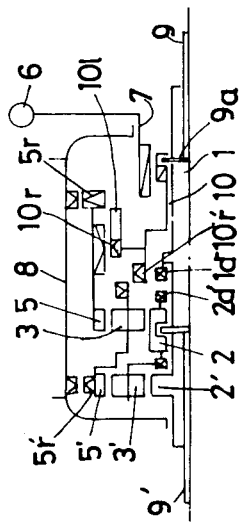
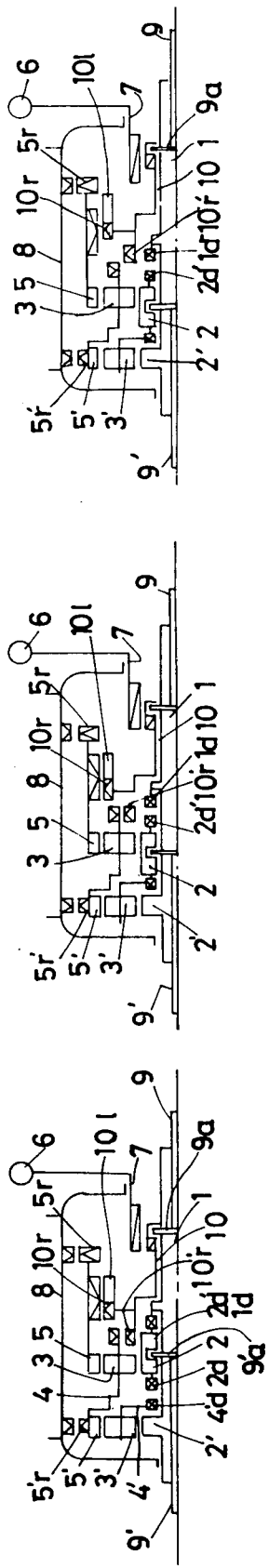
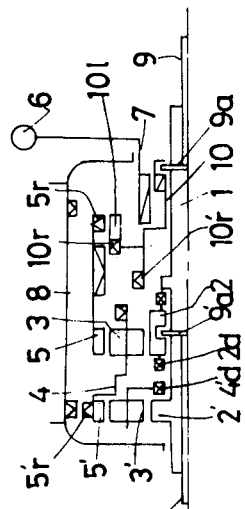

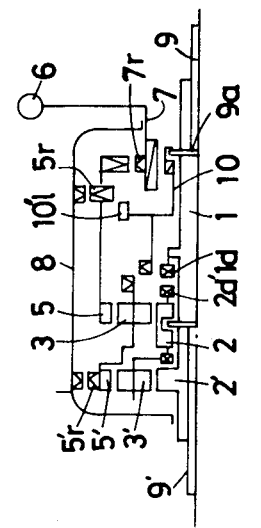
FIG.17A
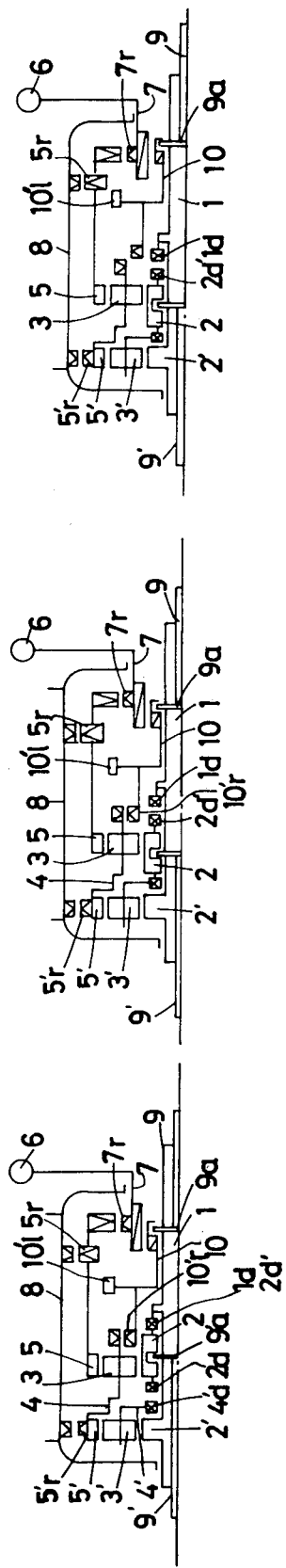
FIG.17B
FIG.17C
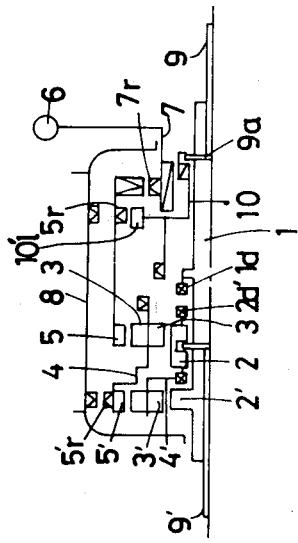
FIG.17D
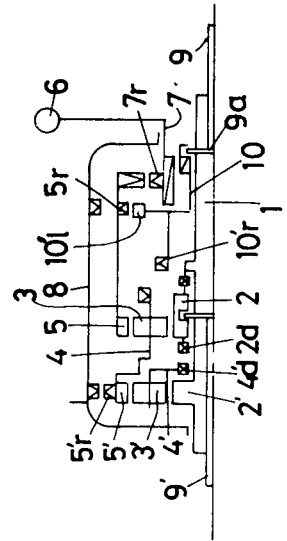
FIG.17E

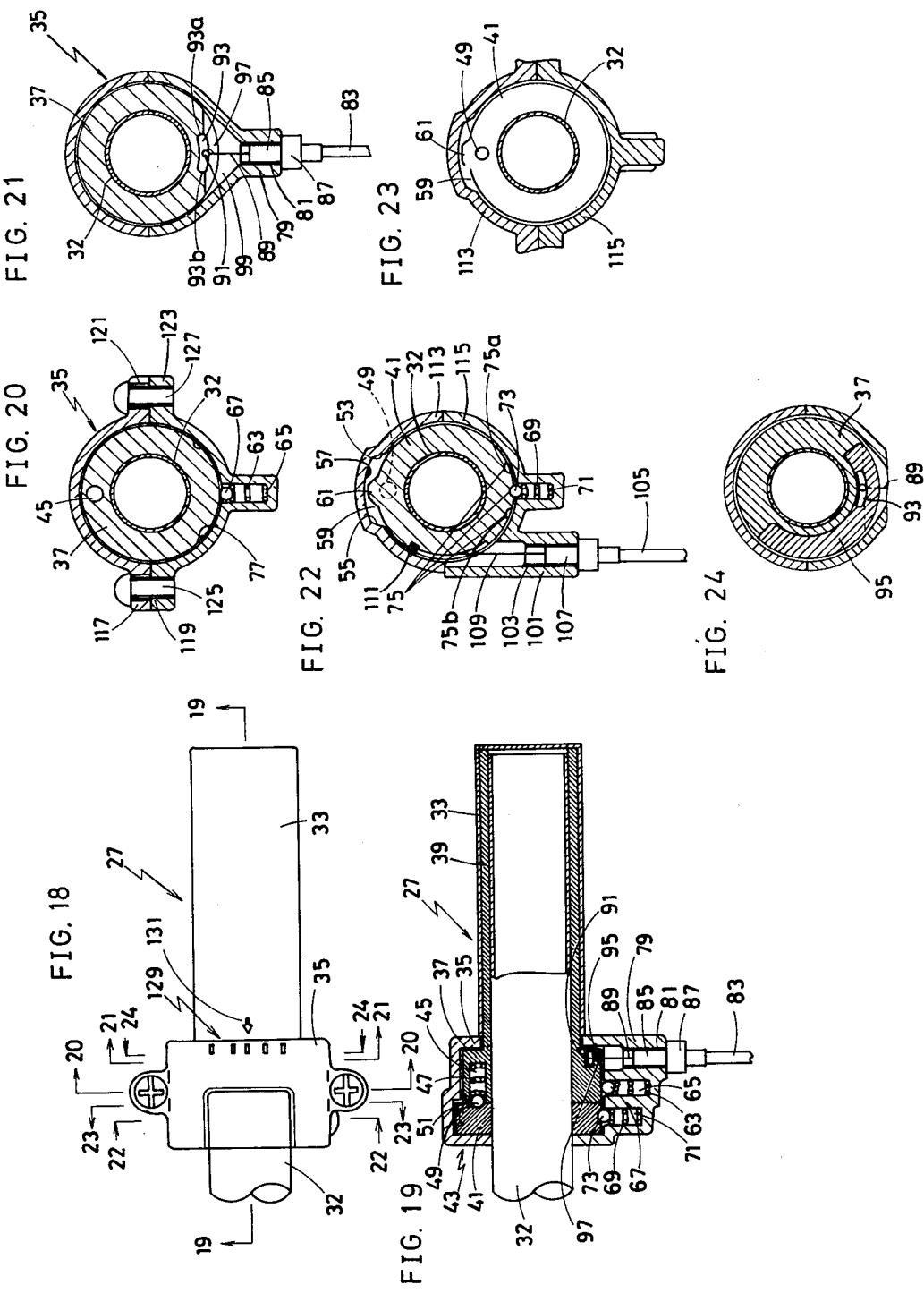

INTERNALLY ACCOMMODATED SPEED CHANGE MECHANISM APPLICABLE TO A BICYCLE

The present invention relates to an internally accommodated speed change mechanism applicable principally to driving of a rear wheel of a bicycle, and this invention further relates to the internally accommodated speed change mechanism in which two sets of the planetary gear mechanism are installed in parallel arrangement inside the hub body in a combined manner, at least one of the sun gears of this planetary gear mechanism is available to rotate or to be locked at will and a dog or ratchet in engagement with a dog or ratchet installed in a ring gear of this planetary gear mechanism is provided in a sleeve or drive input component member.

The conventionally employed internally accommodated speed change mechanisms applicable to driving of a rear wheel of a bicycle have only been limited to those of 2-stage or 3-stage speed change design.

Under this situation, the inherent restricted range of speed caused insufficient deceleration in a steep slope or when running against a head wind and resulted often to a poor acceleration on a paved road of a mild downhill slope.

Additionally, the external dimensions of the internally accommodated speed change hub were limited lengthwise depending upon the size of the bicycle frame, in the axial direction and the outside diameter was also forced to be shrunk to a minimum in an attempt to reduce the weight.

However, for a practiceable method of changing speed, there is no other method left than shifting a speed change rod in the direction of the hub and yet, in this case, a gear could not possibly be shifted in the 3-dimensional space as is the case with the automobiles. Accordingly, the method of shifting the gear in the direction of the hub becomes only available and for the internally accommodated hub involving the speed change mechanism of the most limited space has been available only for the 2-stage or 3-stage application.

The object of the present invention is to offer an internally accommodated 5-stage speed change mechanism and a practical example embodying the present invention shall be described in accompaniment of the attached drawings in the following:

FIGS. 1(A), (B), (C), (D) and (E) the highest, high, intermediate, low and lowest speed condition respectively.

FIGS. 3–17 represent in principle a version of the practical example of the internally accommodated speed change mechanism which has already been shown in principle in FIGS. 1 (A), (B), (C), (D) and (E) in each drawing represent the highest, high, intermediate, low and lowest speed condition respectively.

FIG. 18 represents a plan view of the control grip for operating the internally accommodated speed change mechanism.

FIGS. 19–24 represent cross-sectional views for FIG. 18 along the 19—19 line, 20—20 line, 21—21 line, 22—22 line, 23—23 line and 24—24 line respectively.

The symbols adopted in the drawings:

Figure 1:
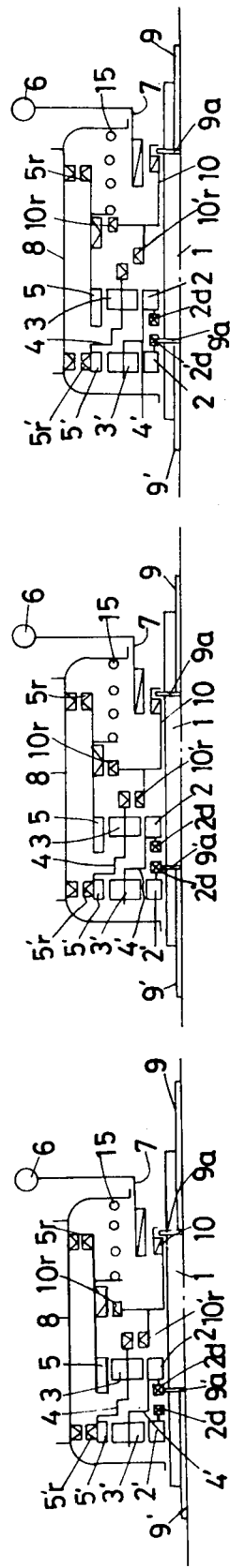
FIG. 1 represents general constructional views of the internally accommodated speed change mechanism embodying the present invention demonstrating its fundamental principle.

 represents a ratchet,  a dog clutch,

 a spline groove, key.

In the attached drawings, 1 represents a hub axle fixed on the vehicle body; 2 the first sun gear (its number of teeth is $2S_1$) installed in the hub axle 1 in a fixed position, however, free to rotate; 2' the second sun gear (number of teeth: $2S_2$) installed in the hub axle 1 in a fixed position, however, free to rotate; 3 the first planetary gear in engagement with the first sun gear 2; 3' the second planetary gear in engagement with the second sun gear 2'; 4 the first carrier supporting the first planetary gear 3 free to rotate; 4' the second carrier supporting the second plentary gear 3' free to rotate; 5 the first ring gear (number of teeth: $2R_1$) in engagement with the first planetary gear 3; 5' the second ring gear (number of teeth: $2R_2$) in engagement with the second planetary gear 3' and being constructed integrally with the first carrier 4; 6 a driving sprocket; 7 a power input component member rotating with the driving sprocket 6; 9 and 9' the first and second speed change rod respectively; 10 a sleeve connected through the spline groove with the power input component member 7 and available to make axial displacement by the first speed change rod 9. The aforesaid second speed change rod 9' serves to fix in a selective manner the first sun gear 2 or the second sun gear 2' on the hub axle 1.

In the case of the highest speed represented in FIG. 1(A), the power supplied from the driving sprocket 6 is transmitted to the hub body 8 through the following route: power input component member 7 → sleeve 10 → the first carrier 4 → the first sun gear 3 → the first ring gear 5 → hub body 8 and the speed ratio turns out as follows:

assuming that $2S_1 = 24\ (24)$ and $2R_1 = 54\ (60)$, $$H = \frac{2S_1 + 2R_1}{2R_1} = \frac{24(24) + 54(60)}{54(60)} = 1,444(1,400)$$

In the case of the high speed represented in FIG. 1(B), the power supplied is transmitted to the hub body 8 through the following route: power input component member 7 → sleeve 10 → the first carrier 4 → the second ring gear 5' → the second planetary gear 3' → the second carrier 4' → the first sun gear 2 → the first planetary gear 3 → the first ring gear 5 → hub body 8 and the speed ratio turns out as follows:

assuming that $2S_2 = 24(30)$, $2R_2 - 54(51)$, $$H = \frac{2S_1 \times 2S_2 + 2R_1 \times (2S_2 + 2R_2)}{2R_1 \times (2S_2 + 2R_2)} =$$
$$\frac{24 \times 24(30) + 54(60) \times [24(30) + 54(51)]}{54(60) \times [24(30) + 54(51)]} = 1.137(1.148)$$

In the case of the intermediate speed represented in FIG. 1(C), the power supplied is transmitted in a direct manner to the hub body 8 through the following route: power input component member 7 → sleeve 10 → the first ring gear 5 → hub body 8 and the speed ratio is as follows:

N = 1.000

In this condition, a pin 9'a installed on the second speed change rod 9' may take any position it will choose.

In the case of the low speed represented in FIG. 1(D) the power supplied is transmitted to the hub body 8 through the following route: power input component member 7 → sleeve 10 → the first ring gear 5 → the first planetary gear 3 → the first carrier 4 = the second ring gear 5' → the second planetary gear 3' → the second gear 4' → the first sun gear 2 → the first planetary gear 3 → the first carrier 4 → the second ring gear 5' → hub body 8 and the speed ratio turns out as follows:

$$L' = \frac{2R_1 \times (2S_2 + 2R_2)}{2S_1 + 2S_2 + 2R_2 \times (2S_2 + 2R_2)} = \frac{54(60) \times [24(30) + 54(51)]}{24 \times 24(30) + 54(60) \times [24(30) + 54(51)]} = 0.880(0.871)$$

Further, in the case of the lowest speed represented in FIG. 1(E), the power supplied is transmitted to the hub body 8 through the following route: power input component member 7 → sleeve 10 → the first ring gear 5 → the first planetary gear 3 → the first carrier 4 → the second ring gear 5' → hub body 8 and the speed ratio $$L = \frac{2R_1}{2S_1 + 2R_1} = \frac{54(60)}{24 + 54(60)} = 0.692(0.714)$$

Figure 2:
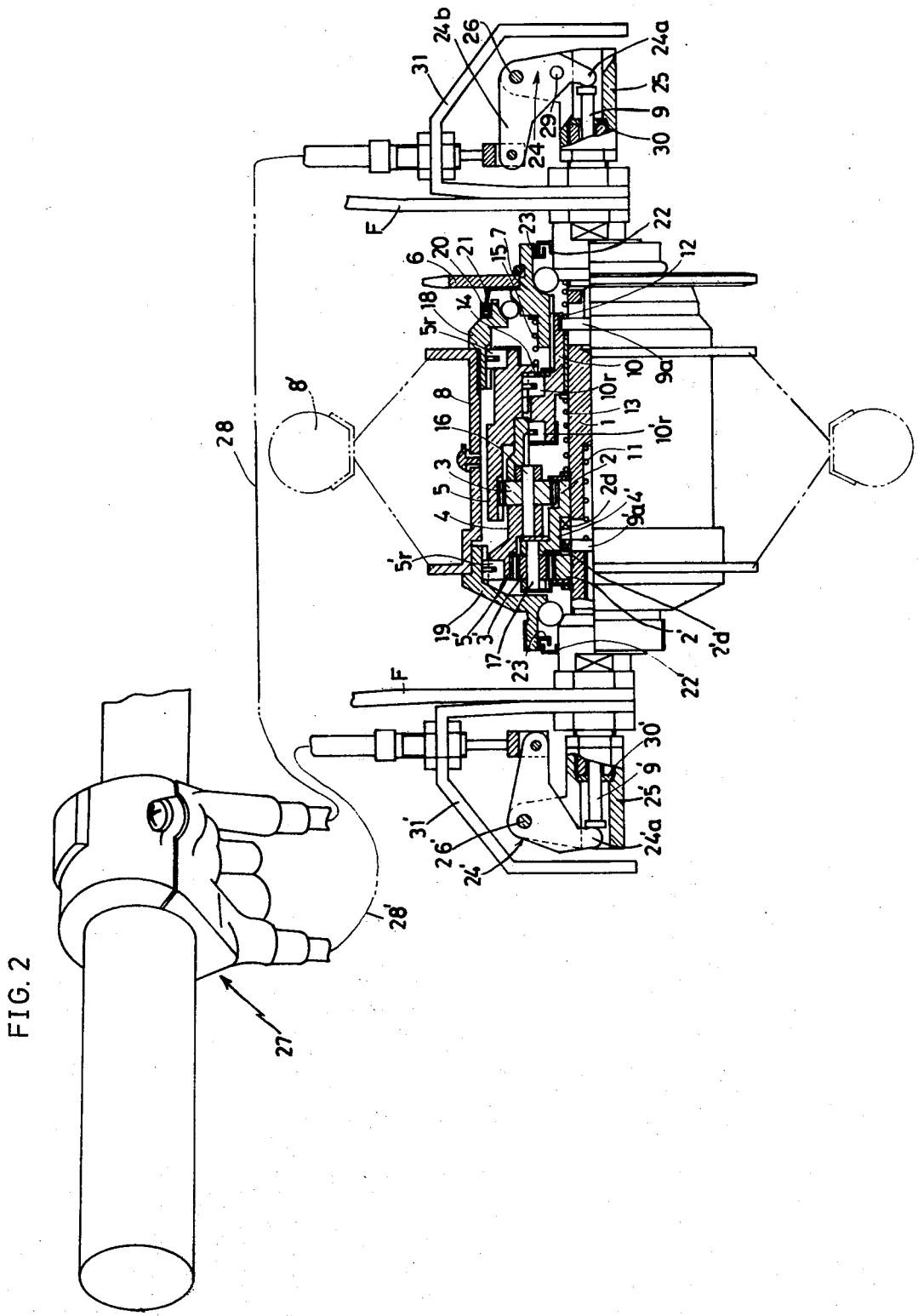
FIG. 2 represents a specific representation of the internally accommodated speed change mechanism related to FIG. 1, showing a front view with a cross-section of a portion of the mechanism.
Figure 9C:
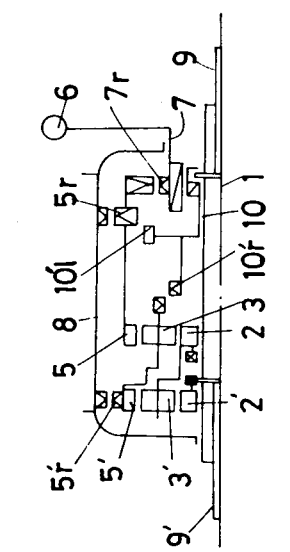
Figure 9B:
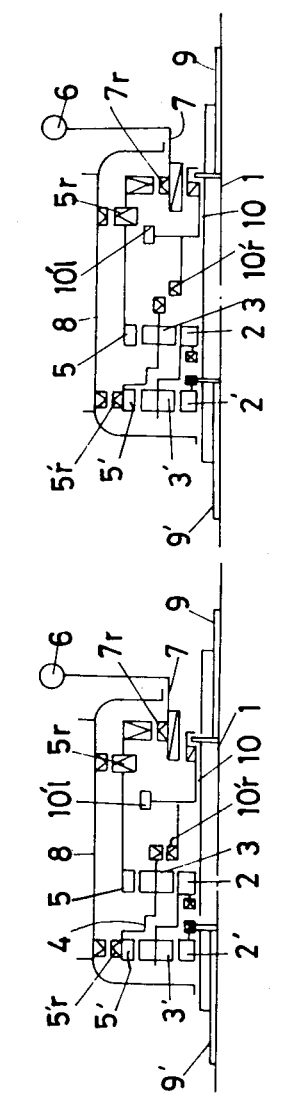
Figure 9A:
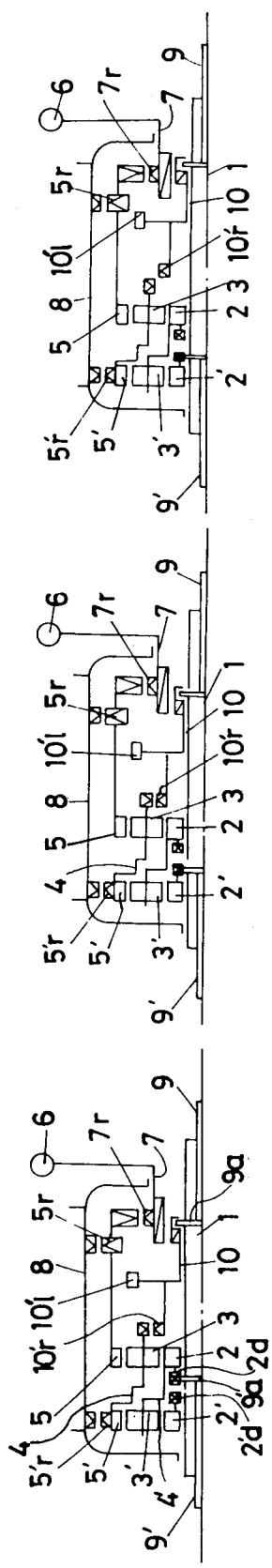
Figure 9E:
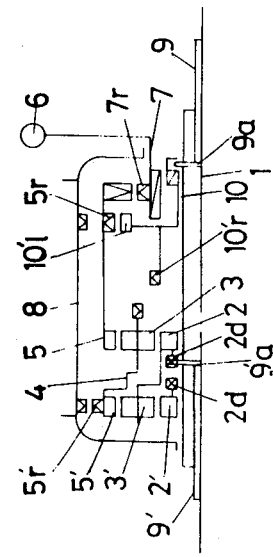
Figure 9D:
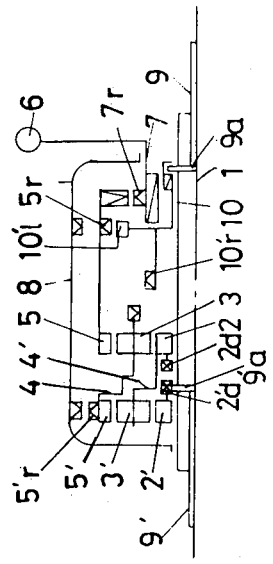
Figure 11A:
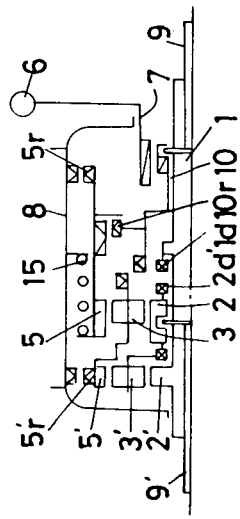
Figure 11B:
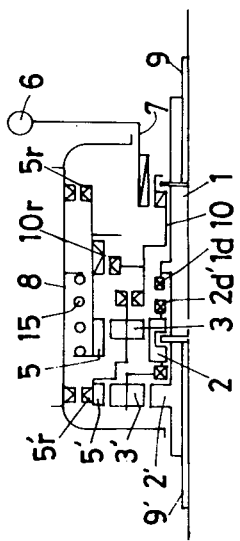
Figure 11C:
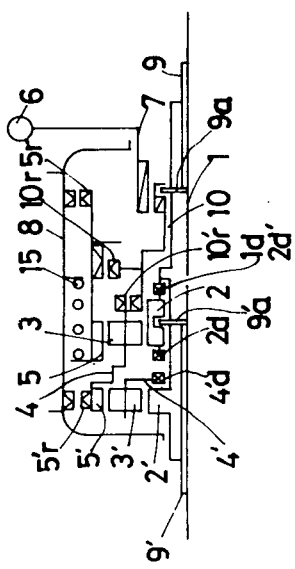
Figure 11D:
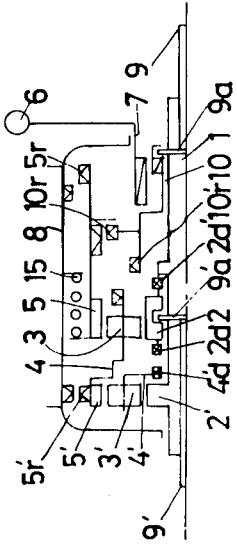
Figure 11E:
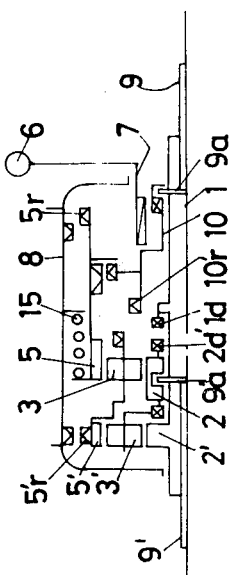
Figure 16A:
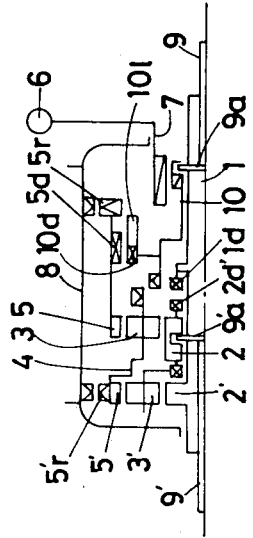
Figure 16B:
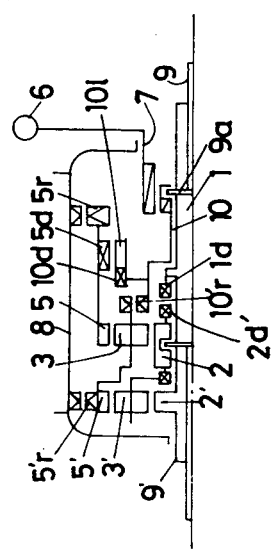
Figure 16C:
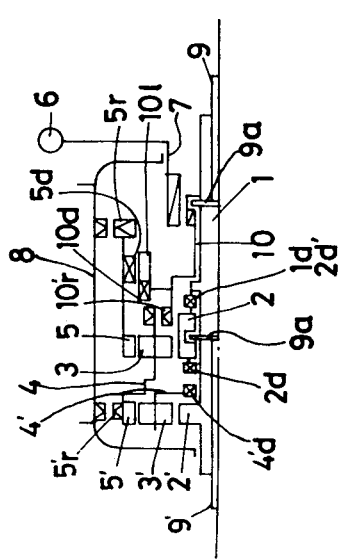
Figure 16D:
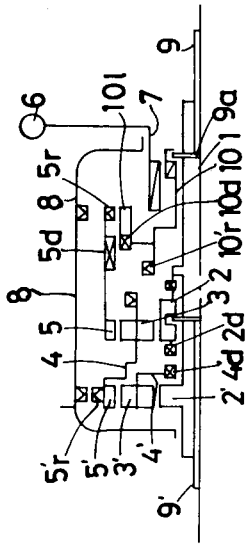
Figure 16E:
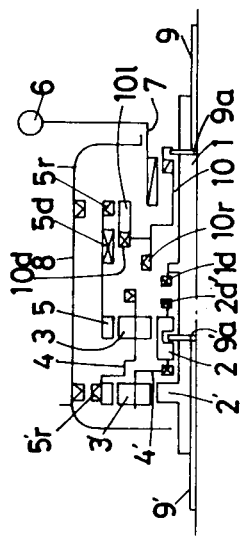

Next, construction of a practical example embodying the present intention shall be described in detail in accordance with FIG. 2. FIG. 2 represents a partial cross-sectional front view of the mechanism and it represents the intermediate speed condition shown in the same as described in princple in FIG. 1(C). As per the symbols used in this drawing, a part given with the same symbol as that in FIG. 1 is the same part. Namely, 1 represents a hub axle supported fixedly on its both ends in the frame F of the bicycle, 2 and 2' the first and second sun gear in engagement free to rotate, but fixed in position in the hub axle 1, 3 the first planetary gear in engagement with the first sun gear 2, 3' the second planetary gear in engagement with the second sun gear 2', 4 the first carrier supporting the first planetary gear 3 free to rotate, 4' the second carrier supporting the second planetary gear 3' free to rotate and constructed integrally with the first sun gear 2, 5 the first ring gear in engagement with the first planetary gear, 5' the second ring gear in engagement with the second planetary gear 3' and constructed integrally with the first carrier 4. 6 a driving sprocket, 7 a power input component member rotating integrally with the driving sprocket 6. 8 a hub body rotating integrally with the rear wheel 8', 9, 9' the first and the second speed change rod respectively, 10 a sleeve connected with the power input component member 7 through the spline grooves and making displacement in the axial direction by the first speed change rod 9. The aforesaid second speed change rod' causes the pin 9'a installed free to slide in the axial direction in the hub axle 1 against the force of the spring 11 and fixes selectively the first sun gear 2 and the second sun gear 2' by means of the selective connection with the dog clutch 2d of the first sun gear 1 or with the dog clutch 2'd of the second sun gear 2'. The sun gear 2 is installed free to rotate in the hub axle 1 and a spring 13 is inserted between the sleeve 10. The lefthand end of the second carrier 4' constructed integrally with the first sun gear 2 is contacted with the second sun gear 2' and accordingly, the first sun gear 2 is free to rotate relative to the hub axle 1, however, its axial displacement is not available. The second sun gear 2' is installed free to rotate in the hub axle 1, however, its axial displacement is not available, because it is located between the inside stepped part of the second carrier 4' under the pressure of the aforesaid spring 13 and the stepped part of the hub axle 1.

2d and 2'd represent the dog clutches installed on the sun gear 2 and the second sun gear 2' respectively and by their engagement with the aforesaid pin 9'a respectively, the first sun gear 2 or the second sun gear 2' is fixed selectively relative to the hub axle 1. On the hub axle 1 is installed free to rotate the pin 9a fixed on the end of the first speed change rod 9 and the sleeve 10 making displacement integrally in the axial displacement by way of the washer and snap ring 12, by the pin 9a is installed in the hub axle 1 free to rotate. The sleeve 10 is limited for its displacement in the axial direction by a washer installed externally free to rotate on the hub axle 1 and supported by the pin 9a and by the snap ring 12 and the sleeve 10 makes displacement with the first speed change rod 9. 10'r represents a ratchet installed on the sleeve 10. The aforesaid ratchet 10'r may be replaced by a clutch such as a dog clutch. The first ring gear 5 is in engagement with the ratchet 10r installed on the sleeve 10 and the first ring gear 5 and the sleeve 10 are so constructed that they can be rotated in an integral manner in one direction, however, they are restricted to make an axial displacement by the washer and snap ring 14 and further, they are under pressure in the lefthand direction by a spring 15 operating to assure the engagement of the first ring gear 5 and the first planetary gear 3.

Further, the spring 15 represents a spring of less strength as compared with the spring 13. As the result of the above mentioned arrangement, the first speed change rod 9, sleeve 10, and the first ring gear 5 are available to make a free displacement in an integral manner in the axial direction.

The first planetary gear 3 is installed free to rotate in the first carrier 4 by means of a shaft 16 and a ratchet driven body (inside peripheral groove) in engagement in a free manner with the aforesaid ratchet 10'r is installed on the righthand end of the first carrier 4. The aforesaid ratchet driven body, when the ratchet 10'r is replaced by a dog clutch, can also be replaced by a dog clutch or similar machine element in a corresponding manner. On the lefthand side of the first carrier 4, is formed the second ring gear 5' in an integral manner and it is in engagement with the second planetary gear 3'. A shaft 17 supporting the second planetary gear 3' free to rotate is installed in the second carrier 4'.

On the outside periphery of the first ring gear 5 is installed the ratchet 5r and the ratchet is detachably connected with the ratchet driven body (inside peripheral groove) provided on the inside periphery of the righthand bowl 18 jointed with the hub body 8 with a thread. 19 represents a lefthand side bowl jointed with the hub body 8 with a thread and the ratchet driven body (inside peripheral groove) in engagement with the rathet 5'r installed on the outside periphery of the second ring gear 5' is installed on its inside periphery.

FIG. 2 represents the same condition as that in FIG. 1(C) and the first speed change rod 9 is located in the intermediate position and the second speed change rod 9' in the outside position. Namely, the sleeve 10, against the pressure of the spring 13, is held in the intermediate position and the ratchet 10'r is disengaged from connection with the first carrier 4. At this moment, the ratchet 10r is in engagement with the first ring gear 5. Further, as the pin 9'a is in engagement with the dog clutch 2'd, the second sun gear 2' is fixed in its position and the first sun gear 2 is free to move. By the result of this arrangement, as shown in FIG. 1(C), the driving force is transmitted and the intermediate speed is obtained. Further, the second sun gear 2' will not necessarily be required to be fixed.

When the first speed change rod 9 is pressed, from the condition represented in FIG. 2, into its inside position and the second speed change rod 9' is allowed to remain in the original outside position, the whole condition turns out to be as shown in FIG. 1(B), that is to say, the high speed can be obtained.

Namely, by the effect of the displacement of the first speed change rod 9 in the righthand direction against the force of spring 13, the sleeve 10 and the first ring gear 5 make displacement in the lefthand direction in an integral manner and the ratchet 10'r is brought into engagement with the first carrier 4. Further, by the second speed change rod 9', the second sun gear 2' becomes fixed. Consequently, as represented in FIG. 1(B), the driving force is transmitted and the high speed is obtained. Further, in this condition the ratchet 5'r is slipping relative to the lefthand bowl 19.

FIG. 1(A) represents a condition in which the first speed change rod 9 is kept similarly in the inside position and the second speed change rod 9' is kept also in the inside position after it is pressed into this particular position and this condition represents the highest speed condition that is to say that the ratchet 10'r and the first carrier 4 are brought to engagement and further, in accompaniment of the displacement of the second speed change rod 9' in the righthand direction, the first sun gear 2 is brought to a standstill and the second sun gear 2' is released. With the result of this arrangement, as represented in FIG. 1(A), the driving force is transmitted and the highest speed is obtained. In this condition, the ratchet 5r is slipping relative to the lefthand bowl 19 and further the ratchet 10r is slipping relative to the first ring gear 5.

FIG. 1(D) represents a condition in which the first speed change rod 9 is located in the outside position after it is drawn out to this particular position and the second speed change rod 9' is kept in the outside position and in this case, the low speed is obtained. That is to say, in accompaniment of the displacement of the first speed change rod 9, the sleeve 10 and the first ring gear 5, by the effect of the spring 13, make displacement in the righthand direction in an integral manner and in accordance with this movement, the engagement of the ratchet 5 r and the righthand bowl 18 becomes released. Further, the engagement of the ratchet 10'r and the first carrier 4 is found disengaged. On the other hand, as the second speed change rod 9' is, like the condition represented in FIG. 1(C), located in the outside position, the second sun gear 2' is fixed and the first sun gear 2 is brought to a free condition.

With the result of this positioning, the driving force is transmitted in the way as shown in FIG. 1(D) and the low speed is obtained. FIG. 1(E) represents a condition in which the first speed change rod 9 is, like the condition represented in FIG. 1(D), located in the outside position and the second speed change rod 9' is, like the condition in FIG. 1(A), located in the inside position and in this condition, the lowest speed is obtained. That is to say, like the condition represented in FIG. 1(D), the engagement of the ratchet 5r and the righthand bowl 18 is disconnected and further, the engagement of the ratchet 10'r and the first carrier 4 is found disengaged. On the other hand, as the second speed change rod 9' is located in the inside position, the first sun gear 2 becomes fixed and the second sun gear 2' becomes released with the result of this positioning, the driving force is transmitted in the way as represented in FIG. 1(E) and the lowest speed is obtained. Summarizing the above mentioned descriptions, a summary table showing the relationship between the positions and the speed change conditions of the first speed change rod 9 and the second speed change rod 9' shall be given in the following:

|  | Second speed change rod | First speed change rod |
| --- | --- | --- |
| Highest speed | Inside | Inside |
| High speed | Outside | Inside |
| Intermediate speed | Outside (or inside) | In the middle |
| Low speed | Outside | Outside |
| Lowest speed | Inside | Outside |

As explained in the above, in this kind of mechanism, the aforesaid first speed change rod requires an intermediate position and the lefthand and righthand operating positions and on the other hand, the second speed change rod requires the lefthand and righthand operating position, however, it does not require necessarily the intermediate position. Accordingly, the range of operation of the second speed change rod may be shorter as compared with that of the first speed change rod.

Further, 20, 21 represent the sealing member closing the clearance between the hub body 8 and the driving sprocket 6, the sealing member 20 is installed on all over the periphery in the neighborhood of the end part of the righthand bowl 18 which is jointed with a thread with the hub body 8 and 20 is installed so as to be overlapped with the sealing member 21 provided on the side of the driving sprocket 21. The aforesaid sealing member 20, 21 are meant to prevent infiltration of water, mud dirt, etc. into the inside of the hub body 8 from the gap existing between the hub body 8 and the driving sprocket 6.

22, 22' represent sealing members shaped in rough U-section installed on all over the external periphery in the neighborhood of the end part of the hub axle 1 and the sealing member 22 is so located that it is overlapped with the sealing member 23 shaped in rough U-section installed on all over the internal periphery in the neighborhood of the external end part of the power input component member 7 and further, the sealing member 22' is located in such a way that it is overlapped with the sealing member 23 shaped in rough U-section installed on all over the internal periphery in the neighborhood of the external end part of the lefthand bowl 19. The sealing members 22, 23 close the gap between the hub axle 1 and the power input member 7, and the sealing members 22', 23' that between the hub axle 1 and the lefthand bowl 19 in order to prevent infiltration to inside of water, mud, dirt, etc. 24, 24' represent the link members hinged with the fulcrum pins 26, 26' on the boss member 25, 25' secured with a thread on both ends of the hub axle 1 and their ends 24a, 24'a are brought into contact with the heads of the first speed change rod 9, the second speed change rod 9' respectively, and the other ends 24b, 24'b are connected with the ends of the control wires 28, 28' extended from the control grip 27 respectively. The aforesaid control grip 27 in rotated in clockwise or counterclockwise direction to pull or release the control wire 28 or 28', rotatingly operate the link member 24 or 24' separately or simultaneously, allowing the first speed change rod 9 and the second speed change rod 9' to make displacement in the axial direction and obtaining the aforesaid the highest, high, intermediate, low and lowest speed. 29 represents a hole perforated through a boss member 25 and the link member 24 in order that these two parts are positioned in a perfect alignment, when the speed change rod 9 is located in the intermediate position between the inside and outside extremes.

The aforesaid hole 29 serves to obtain the intermediate speed by means of driving a pin, in it when the control wire 28, is snapped and the speed change mechanism fails to operate. That is to say, when the above mentioned failure, did happen, the link member 24 is so rotated that the hole 29 becomes located on a straight line and upon reaching this straight line arrangement, a pin or something is inserted into the aforesaid hole 29 in order to improvise tentatively a condition in which the boss member 25 and link member 24 are secured to produce the intermediate speed. 30, 30' are the sealing elements closing the gap between the hub axle 1, the first and the second speed change rod 9, 9' and they serve to prevent infiltration of water, mud, dirt, etc. into the inside through the aforesaid gap. 31, 31' represent the guarding members fixed on the frame F, preventing breakages of the crank members 24, 24' mounted on the end part of the hub axle 1 by hitting directly against the obstacle.

In the above, a practical example embodying the present invention has been described, however, the present invention can be embodied by many other versions, as shown, for example, in principle in FIG. 3 and following drawing, without exceeding from the spirit of the present invention. Further, in the description of some other versions of the practical example of the present invention, the component member having the same function as that mentioned in FIG. 1, shall be given with the same symbol.

FIG. 3 represents another version of the practical example of the present invention which is represented in FIG. 1 in principle, in which the location of the spring 15 is changed.

That is to say, in the case of an example shown in FIG. 1, as demonstrated in full detail in FIG. 2, the spring 15 is positively anchored between the power input member 7 rotating integrally with the driving sprocket 6 and the first ring gear 5 and thus, the relative position of the first ring gear 5 to the first planetary gear 3 and on the contrary, in the arrangement represented in FIG. 3, the spring 15 is anchored between the hub body 8 and the first ring gear 5, the other fundamental construction being similar with the arrangement represented in principle in FIG. 1. Further, FIGS. 3(A), (B), (C), (D) and (E) represents the highest, high, intermediate, low and the lowest speed condition respectively. FIG. 4 represents an arrangement in which, in place of the ratchet 10r or inserted between the sleeve 10 and the first ring gear 5 as represented in principle in FIG. 1, the dog clutches 10d, 5d are detachably installed on the sleeve 10 and the first ring gear 5 respectively, the rest of the fundamental construction being similar with that represented in FIG. 1. Further, FIGS. 4(A), (B), (C), (D) and (E) represents the highest, high, intermediate, low and the lowest speed condition in principle respectively.

FIG. 5 represents a version of the modified practical example shown in principle in FIG. 3. That is to say, in the illustration FIG. 3 showing a fundamental principle, in the same way as FIG. 1 showing also the fundamental principle, the ratchet 10r is inserted between the sleeve 10 and the first ring gear 5, however, in the case of FIG. 5, in place of the aforesaid ratchet 10r, a ratchet 7r corresponding to the aforesaid ratchet 10 is inserted between the power input component member 7 and the first ring gear 5, the rest of arrangement in principle being identical with the illustration in principle shown in FIG. 3. Further, FIGS. 5 (A), (B), (C), (D), and (E) represents in principle the highest, high, intermediate, low and the lowest speed condition respectively.

FIG. 6 represents a version of the modified practical example and FIG. 6 represents in principle a changed position of the spring 15. That is to say, in the case represented in FIG. 5, the spring is anchored between the hub body 8 and the first ring gear 5 and on the other hand, in the case of FIG. 6, FIG. 6 represents physically that the spring 15 is anchored between the power input component member 7 and the first ring gear 5, the rest of the arrangement in principle remaining identical with the fundamental construction represented in FIG. 5. Further, FIGS. 6 (A), (B), (C), (D), and (E) represents in principle the highest, high, intermediate, low and the lowest speed condition respectively.

FIG. 7 represents an arrangement in which the spring 15 shown in principle in FIG. 1 is deleted and further, a sideway extension part 10 l operating connection and disconnection with and from the ratchet 5r by means of connecting and disconnecting the ratchet 10r with and from the ratchet pawl (not shown in the illustration) of the ratchet 5, with the rest of the arrangement in principle remaining the same with the arrangement shown in FIG. 1. Further, FIGS. 7(A), (B), and (C) represents the condition in which the sideway extension part 10 l of the ratchet 10r is detached from the pawl of the ratchet 5r and the ratchet 5r is brought into engagement, showing the highest, high, and intermediate speed condition in principle respectively. Further, FIGS. 7 (D) and (E) represents a condition in which the sideway extension part 10 l of the ratchet 10r is connected with the pawl of the ratchet 5r and the ratchet 5r is brought out of connection, representing the low and the lowest speed condition in principle respectively.

FIG. 8 represents another version of the modified practical example represented in FIG. 7 in principle. That is to say, the ratchet 10r represented in FIG. 7 is modified to the dog clutches 10d and 5d, with the rest of the arrangement remaining the same as that shown in principle in FIG. 7. Further, FIGS. 8(A), (B), (C), (D) and (E) represents the highest, high, intermediate, low and the lowest speed condition in detail respectively.

FIG. 9 represents a version of the modified practical example represented in FIG. 7 in principle. That is to say, in the case of FIG. 7, the ratchet 10r and the sideway extension part 10 l are constructed integrally and in the case of FIG. 9, in place of the ratchet 10r, the ratchet 7r is inserted between the power input component member 7 and the first ring gear 5 as represented in FIG. 5 and in the sleeve 10, a pawl engaging piece 10'l is installed which operates connection and disconnec- FIG. 18 through FIG. 24 represents the specific construction of the aforesaid control grip 27 operating the aforesaid internally accommodated speed change mechanism and in the illustrations following FIG. 18, 32 represents a handle of bicycle, 33 a grip and 35 a cover. 37 represents a connecting component member of the first control wire fitted in a rotating manner in the handle wire 32 and the outside periphery is provided with a circular shape and on one side, a long tube 34 of thin thickness extending in the axial direction is provided. 41 represents a connecting component member of the second control wire and it constitutes a control mechanism 43 of this particular control grip 27 together with the connecting component member of the first control wire 37. 45 represents a blind hole containing a spring 47 bored on the end surface of the connecting component member 37 of the first control wire, 49 a spherical recess located on the end surface of the connecting component member 41 of the second control wire. It is understood from the above description that the connecting component member 37 of the first control wire is in contact with the connecting component member 41 of the second control wire by means of the spring 47 and ball 51.

The aforesaid cover 35 encircles free to slide an outstanding portion of the periphery excepting the rod part of the connecting component member 37 of the first control wire. This arrangement is most clearly shown in FIG. 5 and FIG. 6. Further the aforesaid cover 35 encircles free to slide an outstanding portion of the periphery of the connecting component member 41 of the second control wire, however, an arc-shaped recess consisting, on its one side, of side walls 53 and 55 and a bottom surface 57 and it is so constructed that a projection 61 provided on the connecting component member 41 of the second control wire can make a displacement between the side walls 53 and 55. This situation is most distinctly shown in FIG. 22 and FIG. 23 and other illustrations. In the inside peripheral surface of the cover 35 and in the location which corresponds to the location of the connecting component member 37 of the first control wire, a blind hole 65 is perforated to fit a spring 63 and a ball 67 is fit in place under an elastic pressure in the peripheral surface of the connecting component member 37 of the first control wire. In a similar manner, a blind hole 71 is provided in order to house a spring 69 in the location corresponding to the connecting component member 41 of the second control wire and a ball 73 is contained in place under an elastic pressure, especially in the peripheral surface of the connecting component member 41 of the second control wire are provided with a plurality of small spherical recesses 75 and these recesses are contacted with the balls 73 under the pressure of the spring 69. Further, in a similar manner, a similar plurality of spherical recesses 77 are provided (Reference is made to FIG. 20) for the connecting component member 37 of the first control wire.

From what has been described in the above, the following clarification can be derived: when the grip 33 is grasped and give with rotation in a random direction, the connection component member 37 of the first control wire is made to rotate in the direction and in the same range with that covered by the grip. In accompaniment of this motion, the connecting component member 41 of the second control wire, by means of the spring 47 and ball 51, rotates also in the same direction with the connecting component member 37 of the first control wire, giving pushing and drawing motions of the aforesaid plurality of balls in and out of the aforesaid recesses 75. Additionally, the projection 61 is stopped by either of the side wall 53 or 55 and the further rotation is prevented, the ball 51 is forced to enter against the pressure of the spring 47 into the blind hole 45 by the end surface of the connecting component member 41 of the second control wire and making displacement on the end surface of the connecting component member 41 of the second control wire, the connecting component member 37 of the first control wire makes additional rotations by the same amount with that of the grip 33. In the meantime, the connecting component member 41 of the control wire is made to maintain by the elastic pressure of the ball 73 anchored in the recess 75 in the correct stationary position.

The cover 35 is provided with a flange 79 in a projecting manner and in the threaded hole 81 bored in its inside is jointed with a leg portion 85 of the wire guiding component member 83 with a thread. 87 represents a nut meant for stopping loosening of the threaded joint. 89 represents the first control wire which corresponds to the control wire 28' connected indirectly with the aforesaid second speed change rod 9' on its one end as represented in FIG. 2 and on the other end a connecting piece 91 is provided. On the part corresponding to the aforesaid flange 79 of the connecting component member 37 of the first control wire a circular arc-shaped space 93 is provided in order to accommodate free to slide the aforesaid connecting piece 91. In this particular practical example, a side surface is machine cut and this finished surface is covered with a semicircular washer 95 and by this arrangement, the space 97 is formed to allow the passage of the first control wire 89. 99 represents a space formed between the inside of the flange 79 and the connecting component member 37 of the first control wire.

On the part of the cover 35 which is corresponding to the connecting component member 41 of the second control wire is provided a flange 101 and on the flange 101, a threaded hole 103 is provided and with which a leg 107 of the wire guiding component member 105 is jointed with a thread.

109 represents the second control wire corresponding to the aforesaid control wire 28, one end of which being connected indirectly with the aforesaid first speed change 9 as represented in FIG. 2 and the other end being connected terminatingly with a proper position on the outside periphery of the connecting component member 41 of the second control wire by means of the connecting piece 111.

Further, a cover 35 is composed of an upper cover 113 and lower cover 115 and a detachable unit is established by combining these above mentioned cover components and opposedly located flanges 117, 119 and 121, 123 by means of the assembling pieces 125 and 127. 129 represent a plurality of divisions attached on the grip 33 side of the cover 35 and 131 represents an arrow located in an opposed manner to the aforesaid division on the grip 33. The division 129 and arrow 131 are provided with indication that facilitates the handling to be described at the latter part of this description.

Next, the description of the functions of the above mentioned construction shall be given in the following:

For the sake of simplification of the description, an assumption is made that, in FIG. 20, FIG. 21, FIG. 22 and FIG. 23, the connecting component part 37 of the first control wire is located in the outside position and tion of the aforesaid ratchet 5r by means of connecting and disconnecting the ratchet 5r located between the first ring gear 5 and hub body 8. The aforesaid pawl engaging piece 10′ performs a function in the same way as the sideway extension part 10 l represented in FIG. 7 and as represented in principle in FIGS. 9(A), (B) and (C), when it is disconnected from the ratchet 5r, the engagement of the ratchet 5r becomes available and when, as represented in principle in FIGS. 9(D) and (E) engagement is built up with the ratchet 5r, the ratchet 5′r is disengaged. Further, FIGS. 9(A), (B), (C), (D) and (E) represents the highest, high, intermediate, low and the lowest speed condition in principle respectively.

FIG. 10 represents another version of a modified practical example represented in principle in FIG. 1. That is to say, in this version of the practical example, the first sun gear 2 and the second carrier 4′ are installed separately and at the same time, the first sun gear 2 is installed free to rotate and free to make displacement relative to the hub axle 1 and the aforesaid sun gear 2 and the pin 9′ of the second speed change rod 9′ are brought to engagement and the second speed change rod 9′ and the first sun gear 2 are available to make displacement in an integral manner and the dog clutch 2d located on one side of the aforesaid sun gear is connectable and disconnectable with and from the dog clutch 4′d installed on the aforesaid second carrier 4′ and further, the dog clutch 2d′ located on the other side of the aforesaid first sun gear 2 is made to be connected and disconnected with and from the dog clutch 1d installed in the hub axle 1 and the second sun gear 2′ is installed in the hub axle 1 in an integral manner. Further, the rest of the construction in principle remains the same with that of FIG. 1 and FIGS. 10 (A), (B), (C), (D) and (E) represents the highest, high, intermediate, low and the lowest speed condition in principle respectively.

FIG. 11 represents a version of a modified practical example represented in FIG. 10 and the spring 15 represented in FIG. 10 is moved to a location between the hub body 8 and the first ring gear 5 and the rest of the construction in principle is exactly the same with that represented in FIG. 10. Further, FIGS. 11 (A), (B), (C), (D) and (E) represents the highest, high, intermediate, low and the lowest speed in principle respectively. FIG. 12 represents a version of a modified practical example represented in FIG. 10 and in place of the ratchet 10r represented in FIG. 10, the sleeve 10 and the first ring gear 5 are provided with the detachable dog clutches 10d and 5d respectively and the rest of the construction in principle remains exactly the same with that represented in FIG. 10. Further, FIG. 12(A) and FIG. 12(B) represents a condition in which the dog clutch 10d and 5d is released, representing in principle the highest and high speed condition respectively. FIGS. 12(C), (D) and (E) represents a condition in which the dog clutch 10d and 5d is engaged and the intermediate, low and lowest speed condition is represented in principle respectively.

FIG. 13 represents a version of a modified practical example represented in FIG. 11. That is to say, the modified practical example represented in FIG. 11 represents the condition in which the ratchet 10r is inserted between the sleeve 10 and the first ring gear 5 and on the other hand, in this particular modified practical example, the ratchet 7r corresponding to the aforesaid ratchet 10r is installed between the power input component member 7 and the first ring gear 5 and the rest of the construction in principle is exactly the same with that represented in FIG. 11. Further, FIGS. 13 (A), (B), (C), (D) and (E) represents the highest, high, intermediate, low and the lowest speed condition in principle respectively.

FIG. 14 represents in principle a version of a modified practical example shown in FIG. 13 and in this particular illustration, the installed position of the spring 15 represented in FIG. 13 is changed and the rest of the construction in principle is exactly the same with that represented in FIG. 13. Further, 14 (A), (B), (C), (D) and (E) represents in principle the highest, high, intermediate, low and lowest speed condition respectively.

FIG. 15 represents a condition in which the spring 15 represented in the illustration of a modified practical example represented in FIG. 10 is deleted and further, the sideway extension piece 10 l which performs engagement and disengagement of the ratchet 5r by means of connecting and disconnecting the ratchet pawl part (not shown in the drawing) with and from the ratchet 10r and the rest of the construction in principle is the same with that represented in principle in FIG. 10.

Further, FIG. 15 (A), (B) and (C) represents a condition in which the sideway extension part 10 l of the ratchet 10r is separated from the pawl part of the ratchet 5r and brought to engagement with the ratchet 5r and represents in principle the highest, high and intermediate speed condition respectively. Further, FIG. 15(D) and (E) represents a condition in which the sideway extension body 10 l of the ratchet 10r is brought to engagement with the pawl part of the ratchet 5r and disengaged from the ratchet 5r and represents the low and the lowest speed condition in principle respectively.

FIG. 16 represents a version of a modified practical example shown in principle in FIG. 15. That is to say, the ratchet 10r represented in FIG. 15 is replaced by the dog clutch 10d and 5r and the rest construction in principle remains the same with that represented in FIG. 15. Further, FIG. 16 (A), (B), (C), (D) and (E) represents in principle the highest, high, intermediate, low and the lowest speed condition respectively.

FIG. 17 represents a further version of the modified practical example represented in principle in FIG. 15. That is to say that in the case of the arrangement shown in FIG. 15, the ratchet 10r and the sideway extension part 10 l are installed in an integrated manner, however, in the case of FIG. 17, in the place of the ratchet 10r, the ratchet 7r is installed between the power input part 7 and the first ring gear 5 as illustrated in FIG. 13, and on the sleeve 10 is installed the pawl engaging piece 10 l performing engagement and disengagement of the aforesaid ratchet 5r by means of engaging and disengaging with and from the pawl body of the ratchet 5 inserted between the first ring gear 5 and hub body 8. The aforesaid pawl engaging piece 10′l performs the same function as the sideway extension part 10 l as represented in FIG. 15 and as represented in principle in FIG. 17 (A), (B) and (C), when it is separated from the ratchet 5r, the engagement of the ratchet 5r is admitted and when it is brought to engagement with the ratchet 5r as represented in principle in FIG. 17 (D) and (E), the ratchet 5r is brought out of engagement. Further, FIG. 17 (A), (B), (C), (D) and (E) represents the highest, high, intermediate, low and the lowest speed condition in principle respectively.

the connecting component part 41 of the second control wire is located in the middle position.

Now, when the grip 33 is held tightly and the grip 33 is related to rotate the connecting component member 37 of the first control wire in the clockwise direction as shown in FIG. 20 and FIG. 21, in such a way that the connecting piece 91 strikes against the side wall 93a of the space 93 with a circular-arc shape, the connecting piece 91 is made to slide inside the space 93 and this motion does not cause a traction of the first control wire 89 and accordingly, the second speed change rod 9' retains unaffectedly the original outside position. On the other hand, in accompaniment of the rotation of the aforesaid connecting component member 37 of the first control wire, by the intervention of the spring 47 and ball 51, the connecting component member 41 of the second control wire is allowed to rotate in the clockwise direction in an integral manner and the projection 61 is brought to contact with the side wall 53 of the recess 59 and at the same time, a pulling force is given to the second control wire 109 and consequently, the first speed change rod 9 is pushed by the link component member 24 and takes an inside position, that is to say, the high speed condition is attained with the first speed change rod 9 located in the inside position and the second speed change rod 9' located in the outside position.

Further, at this moment, the ball 37 is brought to contact with the 75a located inside the recess 75.

Next, when the connecting component member 37 of the first control wire is rotated further through a large angle in the clockwise rotation, as the connecting component member 41 of the second control wire remains unrotated because of its extension 61 being in contact with the side wall 53, the first speed change rod 9 is held in the inside position, the ball 51 is forced into the blind hole 45 against the spring 47, only the connecting component member 37 of the first control wire is made to make further rotation in the clockwise direction. Accordingly, the connecting piece 91 makes a rotation in the clockwise direction as it is in contact with the side wall 93a of the space 93, giving a pulling force to the first control wire 89. Because of this situation, the second speed change rod 9' is pushed by the link component member 24' to make displacement to the inside position. Accordingly, in this case, the first speed change rod 9 and the second speed change rod 9' are both located in the inside position and thus, the highest speed is obtained.

Opposite to the above mentioned description, when in FIG. 21, the connecting component member 91 is allowed to rotate from the intermediate speed condition illustrated in FIG. 21, FIG. 22 and FIG. 23 until it is brought to contact with the side wall part 93b of the circular-arc shaped space 93 in the counterclockwise direction, the connecting component member 91 slides inside the space 93 and does not pull the first control wire 89 and accordingly, the second speed change rod 9' is caused by an action of the spring 11, maintained in the outside position. On the other hand, as the connecting component member 41 of the second control wire rotates in the counterclockwise direction with the connecting component member 37 of the first control wire in an integral manner by means of the spring 47, ball 51, the second control wire 109 becomes to be pushed and consequently, the sleeve 10, is made to slide in the right-hand direction under an action of the spring 13 and thus, the first speed change rod 9 is made to move to the outside position. Because of this situation, as the first speed change rod 9 is located in the outside position, and further, the second speed change rod 9' is located in the outside position, the lower speed is obtained. Further, in this case, the projection 61 attached on the connecting component member 41 of the second control wire is brought to contact with the side wall 55 of the recess 59 and the ball 73 is brought to connection with the 75b inside the recess 75.

Next, when the connecting component member 37 of the first control wire is rotated through a large angle in the counterclockwise direction, the connecting component member 41 of the second control wire 41 stays unrotated and keeps the first speed change rod 9 in the outside position and only the connecting component member 37 of the first control wire. Accordingly, the connecting piece 91, by an action of the side wall part 93b of the space 93, rotates in the counterclockwise direction and pulls the first control wire 89 and further, moves the second speed change rod 9' to the inside position. Accordingly, the first speed change rod 9 is located in the outside position and further, the second speed change rod 9' is located in the inside position and thus, the lowest speed is obtained.

Further, in the case of obtaining the intermediate speed, the only thing to do is to place the first speed change rod 9 in the neutral position between the inside and outside positions and this position has nothing to do with the position of the second speed change rod 9' and accordingly, in the case of obtaining the highest speed or the lowest speed, the first speed change rod 9 should pass through the neutral position and therefore, the intermediate speed becomes available by maintaining the condition prior to the aforesaid operation without rotating through a large angle of the connecting component member 37 of the first control wire.

What is claimed is:

1. An internally accommodated speed change mechanism applicable to a bicycle, comprising in combination:
    a hub axle;
    a hub body mounted for free rotation on said hub axle;
    a first planetary gear mechanism mounted on said hub axle within said hub body;
    a second planetary gear mechanism mounted on said hub axle within said hub body;
    said first planetary gear mechanism having a first sun gear freely rotatable on said hub axle, a first planetary gear in engagement with said first sun gear, and a first ring gear in engagement with said first planetary gear;
    said second planetary gear mechanism having a second sun gear freely rotatable on said hub axle, a second planetary gear in engagement with said second sun gear, and a second ring gear in engagement with said second planetary gear;
    a first carrier connected to said second ring gear and retaining said first planetary gear for rotation about said first sun gear;
    ratchet means associated with said second ring gear and meshing with said hub body;
    a sleeve operatively associated with a drive sprocket and freely rotatable on said hub axle, said sleeve being axially slidable on said hub axle;
    first means on said sleeve to selectably engage said first carrier when said sleeve is at a certain axial position on said hub axle, so that said first carrier and said first planetary gear are rotated by rotation of said drive sprocket;
a first speed change rod disposed in said hub axle for selective axial movement and operatively associated with said sleeve to axially move said sleeve to place said first means in said selectable engagement;
a second speed change rod disposed in said hub axle for selective axial movement independently of said first speed change rod; and
means associated with said second speed change rod to selectably connect either said first sun gear or said second sun gear to said hub axle in response to a certain axial position of said second speed change rod.

2. A speed change mechanism as in claim 1, further comprising second means operatively associated with said sleeve to selectably engage said first ring gear when said sleeve is disposed at a certain axial position in response to movement of said first speed change rod.

3. A speed change mechanism as in claim 1, further comprising a power input member integrally connected to said drive sprocket and operative to drive said sleeve; and a drive ratchet associated with said power input member and operative to drivingly engage said first ring gear.

4. A speed change mechanism as in claim 1, further comprising:
a second carrier connected to said first sun gear and retaining said second planetary gear for rotation about said second sun gear;
a pair of clutches respectively connected to said first and second sun gears; and
said means associated with said second speed change rod is operative to selectably engage one or the other of said clutches as said second speed change rod is selectably axially positioned along said hub axle, so that a selected one of said sun gears is engaged with said hub axle while the other of said sun gears is disengaged from and freely rotatable relative to said hub axle.

5. A speed change mechanism as in claim 1, further comprising:
said first sun gear being mounted to slide axially on said hub axle;
a pair of clutches separately mounted on both sides of said first sun gear;
means integrally mounting said second sun gear on said hub axle;
a second carrier which supports said second planetary gear and rotates therewith with respect to said second sun gear;
a first clutch member mounted on said second carrier in position to be selectably engaged by one of said clutches mounted on said slidable first sun gear;
a second clutch member mounted on said hub axle in position to be selectably engaged by the other of said clutches mounted on said slidable first sun gear; and
said means associated with said second speed change rod is operative to slide said first sun gear to engage either said first clutch member or said second clutch member.

6. A speed change mechanism as in claim 1, further comprising:
a spring axially disposed between said hub body and said first ring gear to press against said ring gear on the side of said first planetary gear mechanism; and
ratchet means disposed in operative relation between said first ring gear and said hub body for driving interconnection when said first ring gear is at a certain axial position.

7. A speed change mechanism as in claim 1, further comprising:
ratchet means mounted on said sleeve and axially slidable therewith to drivingly engage said first ring gear.

8. A speed change mechanism as in claim 1, further comprising:
a pair of mutually engagable dog clutches mounted on said first ring gear and said sleeve for selectable engagement in response to axial positioning of said sleeve by said first speed change rod.

9. A speed change mechanism as in claim 5, further comprising:
a power input member integrally connected to said drive sprocket and operative to drive said sleeve; and
a drive ratchet associated with said power input member and operative to engage said first ring gear, said drive ratchet being axially slidable along said hub axle.

* * * * *